UNITED STATES PATENT OFFICE.

NORBERT STEIGER, OF FRANKFORT-ON-THE-MAIN, AND ERWIN HOFFA AND HANS HEYNA, OF HOCHST-ON-THE-MAIN, GERMANY, ASSIGNORS TO GRASSELLI DYE-STUFF CORPORATION, OF NEW YORK, N. Y., A CORPORATION OF DELAWARE.

ORTHO-CARBOXYAMIDOTHIOGLYCOLIC ACID.

No Drawing. Application filed March 30, 1928, Serial No. 266,111, and in Germany April 12, 1927.

Our copending application Serial No. 266,110, filed on the same date, relates to new ortho-carboxyamidoarylthioglycolic-acids of the general formula:

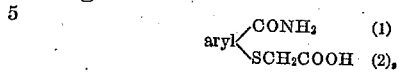

wherein aryl means a substituted aryl residue, and a process of making same which comprises reducing the corresponding ortho-cyanarylsulfochlorides under such conditions, whereby ortho-carboxyamidoarylmercaptanes are formed, and condensing the products thus obtained in an alkaline solution with monochloroacetic-acid.

Our present invention relates to certain embodiments of the above mentioned series of compounds of which the following is an illustrative example in which the parts are by weight and all temperatures are in centigrade degrees:

Example:

35 parts of 1-ethyoxy-4-cyanbenzene-3-sulfochloride of the formula:

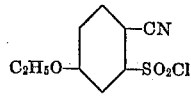

obtainable for instance according to the process mentioned in the copending application by starting from the corresponding para-phenetidine-sulfonic-acid are dissolved in about 100 parts of benzene or chlorobenzene, and at ordinary temperature slowly 20 parts of zinc-dust are added, the temperature increasing to about 60°. After stirring for about an hour at this temperature the mass is cooled down and at about 35° 100 parts of hydrochloric-acid ($d=1,19$) and again 20 parts of zinc dust are slowly added. The mass is stirred at ordinary temperature for some hours. The reaction is finished when a test shows that the well known mercaptane reaction (namely a yellow coloration with lead acetate) does not increase any more. Care should be taken, that during the whole process of reduction practically no nitrogen of the cyanic-group is split off in form of ammonia. This can be ascertained in the following manner: A test of the reduction mass is taken from time to time and is diluted with water, the organic residue is filtered off, the filtrate is made alkaline and boiled. Only traces of ammonia should be ascertainable in these tests.

When the reduction is finished the benzene or chlorobenzene respectively is distilled off and the residue is diluted with water and filtered off. The mercapto compound thus formed of the probable constitution of an 1-ethoxy-4-carboxyamidobenzene-3-mercaptane can directly be used for further technical purposes. It is without being purified mixed with about 300 parts of water and dissolved by addition of about 40 parts of a caustic soda solution of 33° Bé. and 10 parts of monochloroacetic-acid are added. The condensation takes place at ordinary temperatures and is finished in a relatively short time. For precipitating the free acid the mass is acidified preferably with addition of the same volume of a common salt solution.

The 1-ethoxy-4-carboxyamidobenzene-3-thioglycolic acid of the formula:

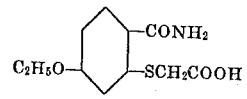

thus separates as a white crystalline powder. It is soluble in hot water and in the usual organic solvents, melting in a pure state at 208-210°.

In the same manner the 1-methoxy-4-carboxyamidobenzene-3-thioglycolic-acid can be obtained.

We claim:

1. As new compounds 1-alkoxy-4-carboxyamidobenzene-3-thioglycolic acids of the formula:

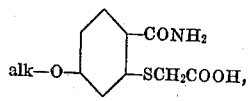

being when dry white crystalline powders, soluble in hot water and the usual organic solvents.

2. As a new compound the 1-ethoxy-4-carboxyamidobenzene-3-thioglycolic acid of the formula:
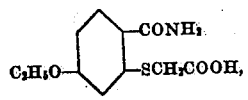
being when dry a white crystalline powder soluble in hot water and in the usual organic solvents, and melting in a pure state at 208–210°.
In testimony whereof, we affix our signatures.
NORBERT STEIGER.
ERWIN HOFFA.
HANS HEYNA.